United States Patent
Jeong et al.

(10) Patent No.: US 9,727,984 B2
(45) Date of Patent: Aug. 8, 2017

(54) ELECTRONIC DEVICE AND METHOD FOR PROCESSING AN IMAGE

(71) Applicant: SAMSUNG ELECTRONICS CO., LTD., Suwon-si (KR)

(72) Inventors: Jin-woo Jeong, Seoul (KR); Beom-joon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 14/465,439

(22) Filed: Aug. 21, 2014

(65) Prior Publication Data

US 2015/0269715 A1   Sep. 24, 2015

(30) Foreign Application Priority Data

Mar. 19, 2014   (KR) .................. 10-2014-0032053

(51) Int. Cl.
  *G06T 5/00*   (2006.01)
  *G06T 11/00*   (2006.01)

(52) U.S. Cl.
  CPC ............ *G06T 11/001* (2013.01); *G06T 5/002* (2013.01); *G06T 5/008* (2013.01); *G06T 2207/20192* (2013.01)

(58) Field of Classification Search
  CPC ....... G06T 5/008; G06T 5/002; G06T 11/001; G06T 2207/20192
  See application file for complete search history.

(56) References Cited

U.S. PATENT DOCUMENTS

| | | | | |
|---|---|---|---|---|
| 6,018,597 A | * | 1/2000 | Maltsev ............... | G06T 3/4007 382/260 |
| 6,728,416 B1 | * | 4/2004 | Gallagher .............. | G06T 5/004 382/173 |
| 6,795,588 B1 | * | 9/2004 | Nio ....................... | H04N 1/409 348/470 |
| 7,269,296 B2 | | 9/2007 | Wang et al. | |
| 8,428,388 B2 | | 4/2013 | Song et al. | |
| 8,599,290 B2 | * | 12/2013 | Chan ........................ | G06T 1/00 348/241 |
| 8,938,105 B2 | * | 1/2015 | Yang ....................... | G06T 5/002 382/131 |
| 9,317,908 B2 | * | 4/2016 | Seow ...................... | G06T 5/009 |
| 2003/0016855 A1 | * | 1/2003 | Shinbata ................ | G06T 5/009 382/132 |
| 2004/0120597 A1 | * | 6/2004 | Le Dinh ................ | H04N 9/646 382/261 |
| 2004/0212625 A1 | * | 10/2004 | Sekine .................... | G06T 15/50 345/582 |

(Continued)

FOREIGN PATENT DOCUMENTS

| JP | 2008-167027 A | | 7/2008 | |
| JP | 2011-090628 | * | 4/2011 | .............. H01J 37/26 |

(Continued)

*Primary Examiner* — Chan Park
*Assistant Examiner* — Mia M Thomas
(74) *Attorney, Agent, or Firm* — Sughrue Mion, PLLC

(57) ABSTRACT

An electronic device and an image processing method are provided. The method acquires image detailed information of an image, detects an edge region and a texture region from the image detail information, and corrects the image detail information by applying different gain values to image signals corresponding to different regions.

12 Claims, 14 Drawing Sheets

(56) References Cited

U.S. PATENT DOCUMENTS

| | | | |
|---|---|---|---|
| 2005/0248666 A1* | 11/2005 | Kim | H04N 5/235 348/230.1 |
| 2005/0249437 A1* | 11/2005 | Wang | G06T 3/403 382/300 |
| 2005/0285952 A1* | 12/2005 | Kwon | H04N 5/20 348/234 |
| 2006/0268168 A1* | 11/2006 | Au | H04N 7/012 348/448 |
| 2007/0116375 A1* | 5/2007 | Utsugi | H04N 9/045 382/264 |
| 2008/0002873 A1* | 1/2008 | Reeves | G06T 7/0012 382/133 |
| 2009/0196524 A1* | 8/2009 | Godin | G06T 5/004 382/263 |
| 2009/0220169 A1* | 9/2009 | Bennett | G06T 5/20 382/268 |
| 2010/0098349 A1* | 4/2010 | Arashima | G09G 3/3648 382/263 |
| 2010/0290716 A1* | 11/2010 | Mori | G06K 9/6255 382/309 |
| 2010/0302416 A1* | 12/2010 | Kawashima | G06T 5/002 348/246 |
| 2010/0321535 A1* | 12/2010 | Rodriguez | G06T 3/00 348/240.2 |
| 2011/0019934 A1* | 1/2011 | Ledinh | H04N 19/176 382/261 |
| 2011/0058031 A1* | 3/2011 | Kurihara | G06K 9/2018 348/135 |
| 2011/0075025 A1* | 3/2011 | Cho | G06T 3/4053 348/441 |
| 2011/0188772 A1* | 8/2011 | Park | G06K 9/40 382/260 |
| 2011/0211636 A1* | 9/2011 | Yamada | H03M 7/4006 375/240.12 |
| 2011/0229053 A1 | 9/2011 | Tezaur | |
| 2011/0279703 A1* | 11/2011 | Lee | H04N 9/735 348/223.1 |
| 2012/0093431 A1* | 4/2012 | Liba | G06T 7/403 382/260 |
| 2012/0242790 A1* | 9/2012 | Sandrew | H04N 13/0267 348/43 |
| 2012/0250979 A1* | 10/2012 | Yokoyama | G06T 5/008 382/154 |
| 2013/0106837 A1* | 5/2013 | Mukherjee | H04N 13/0018 345/419 |
| 2013/0182950 A1* | 7/2013 | Morales | G06T 5/001 382/167 |
| 2013/0314402 A1* | 11/2013 | Furumura | G03B 35/02 345/419 |
| 2014/0028879 A1* | 1/2014 | Morino | G06T 5/007 348/241 |
| 2014/0092231 A1* | 4/2014 | Nakahira | H01J 37/244 348/80 |
| 2014/0111532 A1* | 4/2014 | Manchi | G06T 3/4007 345/582 |
| 2015/0269715 A1* | 9/2015 | Jeong | G06T 11/001 345/582 |

FOREIGN PATENT DOCUMENTS

| | | |
|---|---|---|
| JP | 2011-139127 A | 7/2011 |
| KR | 10-0490432 B1 | 5/2005 |
| KR | 10-1114698 B1 | 2/2012 |

* cited by examiner

ELECTRONIC DEVICE AND METHOD FOR PROCESSING AN IMAGE

CROSS-REFERENCE TO RELATED APPLICATION(S)

This application claims the benefit under 35 USC §119(a) of Korean Patent Application No. 10-2014-0032053, filed on Mar. 19, 2014, in the Korean Intellectual Property Office, the disclosure of which is incorporated herein by reference in its entirety.

BACKGROUND

1. Field

Apparatuses and methods consistent with exemplary embodiments relate to image processing, and more particularly, to a device capable of displaying an improved image by performing image processing on an edge region and a texture region of the image.

2. Description of Related Art

Images are often displayed using various apparatuses. For example, the images may be acquired using digital cameras or scanners. As another example, the images may be downloaded through the Internet.

Resolution, sharpness, and the like, are important factors in determining the quality of an image. These factors may be degraded due to various reasons. Therefore, techniques have been developed to improve the quality of an image.

However, unintended defects may be included in the improved images. For example, as illustrated in FIG. 3, an overshoot represented in a form of a strip 30 in an edge region is generated. There are various related methods for correcting the unintended defects included in the improved images. However, overall sharpness of the images, and the like, may be degraded during the correction of the defects.

SUMMARY

One or more exemplary embodiments overcome the above disadvantages and other disadvantages not described above. Also, an exemplary embodiment is not required to overcome the disadvantages described above, and an exemplary embodiment may not overcome any of the problems described above.

One or more exemplary embodiments provide an electronic device which allows a user to view an improved image in which defects generated during an image processing process are removed, and an image processing method thereof.

According to an aspect of an exemplary embodiment, there is provided a method of processing an image, the method including acquiring image detail information by applying a filter to an image, detecting an edge region and a texture region from the image detail information, and correcting the image detail information by dividing the edge region into a plurality of regions and applying different gain values to image signals corresponding to at least two of the plurality of regions, and applying a gain value to an image signal corresponding to the texture region according a magnitude of the image signal corresponding to the texture region.

The correcting may include dividing the edge region into a first region in which a variation of an image signal corresponding to the edge region is larger than or equal to a preset value and a second region in which the variation is less than the preset value, and applying a first gain value to the first region and a second gain value to the second region.

The correcting may include dividing the edge region into a first region in which a variation of an image signal corresponding to the edge region is larger than or equal to a preset value, a second region that is within a preset range away from the first region, and a third region that is within a preset range away from the second region and that is not included in the first region and the second region, and applying a first gain value to the first region, applying a gain value, which is less than the first gain value and is larger than a second gain value to the second region, and applying the second gain value to the third region.

The applying may include applying a first gain value to the first region, a portion of the second region that is within a preset range away from the first region, and the third region, and applying a second gain value to a region of the second region other than the portion to which the first gain value is applied.

The first gain value may be larger than the second gain value.

The correcting may include, in response to the image signal corresponding to the texture region being larger than or equal to a preset threshold value, correcting the image detail information by applying a gain value that is less than a preset value.

The correcting may include determining a region in which the image signal corresponding to the texture region is larger than or equal to a preset threshold value as a region in which the image signal is saturated.

The correcting may include applying a first gain value in response to the image signal corresponding to the texture region being larger than or equal to a first threshold value, and applying a second gain value in response to the image signal corresponding to the texture region being larger than or equal to a second threshold value, and the first gain value may be different from the second gain value.

According to an aspect of an exemplary embodiment, there is provided an electronic device that includes an acquirer configured to acquire image detail information by applying a filter to an image, a detector configured to detect an edge region and a texture region from the image detail information, and a corrector configured to correct the image detail information by dividing the edge region into a plurality of regions and applying different gain values to image signals corresponding to at least two of the plurality of regions, and applying a gain value to an image signal corresponding to the texture region according a magnitude of the image signal corresponding to the texture region.

The corrector may be configured to divide the edge region into a first region in which a variation of an image signal corresponding to the edge region is larger than or equal to a preset value, and a second region in which the variation is less than the preset value, and apply a first gain value to the first region and a second gain value to the second region.

The corrector may be configured to divide the edge region into a first region in which a variation of an image signal corresponding to the edge region is larger than or equal to a preset value, a second region that is within a preset range away from the first region, and a third region that is within a preset range away from the second region and that is not included in the first region and the second region, and apply a first gain value to the first region and the third region, and apply a second gain value to the second region.

The corrector may be configured to apply the first gain value to the first region, a portion of the second region that is within a preset range away from the first region, and the third region, and apply a second gain value to a region of the second region other than the portion to which the first gain value is applied.

The first gain value may be larger than the second gain value.

The corrector may be configured to, in response to the image signal corresponding to the texture region being larger than or equal to a preset threshold value, correct the image detail information by applying a gain value that is less than a preset value.

The corrector may be configured to determine a region in which the image signal corresponding to the texture region is larger than or equal to a preset threshold value as a region in which the image signal is saturated.

The corrector may be configured to apply a first gain value in response to the image signal corresponding to the texture region being larger than or equal to a first threshold value, and apply a second gain value in response to the image signal corresponding to the texture region being larger than or equal to a second threshold value, and the first gain value may be different from the second gain value.

According to an aspect of another exemplary embodiment, there is provided an apparatus for processing an image, the apparatus including a processor configured to divide an image into a plurality of regions based on at least one of edge information and texture information of the image, and a corrector configured to adjust a sharpness of a first region of the image from among the plurality of regions and to maintain a sharpness in a second region of the image from among the plurality of regions.

The adjusting of the sharpness may be configured to suppress at least one of an undershoot and an overshoot created during image processing of the image.

The corrector may be configured to simultaneously adjust the sharpness of the first region of the image and maintain the sharpness of the second region of the image.

The corrector may be configured to perform shoot suppression in the first region of the image and simultaneously prohibit shoot suppression in the second region of the image.

According to the various exemplary embodiments, the user may view an image in which an overshoot for an edge region is suppressed, and saturation for a texture region is improved.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail certain exemplary embodiments, with reference to the accompanying drawings, in which.

DETAILED DESCRIPTION

Figure 1:
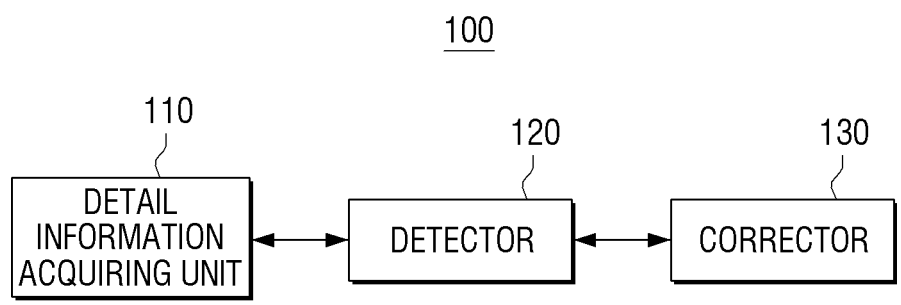
FIG. 1 is a block diagram illustrating an electronic device according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail because they would obscure the exemplary embodiments with unnecessary detail.

FIG. 1 is a block diagram illustrating an electronic device 100 according to an exemplary embodiment. As illustrated in FIG. 1, the electronic device 100 includes a detail information acquiring unit 110, a detector 120, and a corrector 130. For example, the electronic device 100 may be implemented with various electronic devices which include a configuration for displaying an image, such as a television, a computer, a portable phone, a tablet personal computer (PC), a digital camera, a camcorder, a laptop PC, a personal digital assistant (PDA), an appliance, and the like.

The detail information acquiring unit 110 may acquire image detail information by applying a filter to an image. For example, the detail information for the image may be a detail signal acquired by applying a preset filter to the image signal.

The detail information acquiring unit 110 may acquire the detail information for the image by applying a filter to improve sharpness of the image. For example, the detail information acquiring unit 110 may acquire the detail information by performing a filtering process such as an unsharp masking process on an original image. However, this type of filtering is merely exemplary, and the filter or method for acquiring the detail information is not limited to a specific filter.

The detector 120 may detect an edge region and a texture region included in the image detail information. That is, the detector 120 may detect the edge region and the texture region from the image detail information. For example, the edge region may correspond to a region in an image in which brightness, sharpness, or the like, changes, or which includes discontinuities. The edge region may be a boundary of a region and points in which a brightness of pixels is abruptly discontinuously changed.

The detector 120 may calculate an edge map to detect the edge region. For example, the detector 120 may calculate an edge map using a Sobel edge, a Prewitt edge, a Robert edge, a Canney edge, and the like. However, this is merely exemplary, and the filter or mask for detecting the edge region is not limited thereto. As another example, the detector 120 may receive an edge map that is calculated by another device or another unit within the device. As described above, the detector 120 may detect the edge region from the image detail information through various methods.

The detector 120 may detect the texture region of the image using various methods. For example, image texture may be used to quantify the perceived texture of an image. Image texture may provide information about the spatial arrangement of color or intensities in an image or selected region of an image. The detector 120 may divide an input image into blocks, and determine the texture region using the number of pixels connected in each block and luminance changes. As another example, the detector 120 may detect the texture region using a standard deviation of the image. The above-described texture detection methods are merely exemplary, and the detector 120 may use various methods for detecting the texture region from the image detail information.

The detector 120 may detect the edge region, and then detect the texture region, but this is merely exemplary. As another example, the detector 120 may simultaneously detect the edge region and the texture region.

The corrector 130 may correct or otherwise adjust the image detail information. For example, the corrector 130 may perform correction on the edge region by dividing the edge region into a plurality of regions, and apply different gain values to image signals corresponding to the plurality of regions. The corrector 130 may apply a gain value that is below a preset value to correct the detail information in response to the image signal corresponding to the texture region being larger than or equal to a threshold value. One or more of the functions of the corrector 130 may be performed by a processing device or a processor.

For example, the corrector 130 may correct the detail information by dividing the edge region into a first region in which a variation of the image signal corresponding to the edge region is equal to or larger than a preset value, and a second region in which the variation is less than the preset value. The corrector may apply a first gain value to the first region and a second gain value to the second region.

As another example, the corrector 130 may divide the edge region into three regions, and apply different gain values to the three regions. The corrector 130 may divide the edge region into a first region in which the variation of the image signal corresponding to the edge region is equal to or larger than a preset value, a second region which is within a preset range of the first region, and a third region which is within a preset range from the second region and which is not included in the first region or the second region. The corrector 130 may correct the detail information by applying a first gain value to the first region and the third region, and apply a second gain value to the second region.

Alternatively, the corrector 130 may apply the first gain value to the first region, to a region that is included in the second region and that is within a preset range from the first region, and to the third region, and apply the second gain value to a region of the second region other than the region to which the first gain value is applied.

The corrector 130 may widely set the region to which the first gain value is applied by applying the first gain value to the first region and the second region adjacent to the first region. In this example, the first gain value may be larger than the second gain value. For example, the first gain value may be 1 and the second gain value may be 0.1. Alternatively, different gain values may be applied to the first region through the third region. For example, a first gain value may be applied to the first region, a second gain value may be applied to the second region, and a third gain value may be applied to the third region.

Further, the corrector 130 may determine a saturated region as a region in which the image signal corresponding to the texture region is equal to or larger than a preset threshold value. For example, the saturation region may be a region in the image signal that is saturated due to shoot generation. The corrector 130 may correct the detail information for the saturated region.

The corrector 130 may apply the preset first gain value in response to the image signal corresponding to the texture region being equal to or larger than a first threshold value, and apply the second gain in response to the image signal being larger than or equal to a second threshold value. In this example, the second gain value is different from the first gain value. Accordingly, the corrector 130 may divide the texture region into a plurality of regions and apply different gain values to the plurality of regions.

Hereinafter, a method of suppressing a shoot (i.e. undershoot or overshoot) generated based on an edge region included in an image is described with reference to the exemplary embodiments described with respect to FIGS. 2 to 11.

Figure 2:
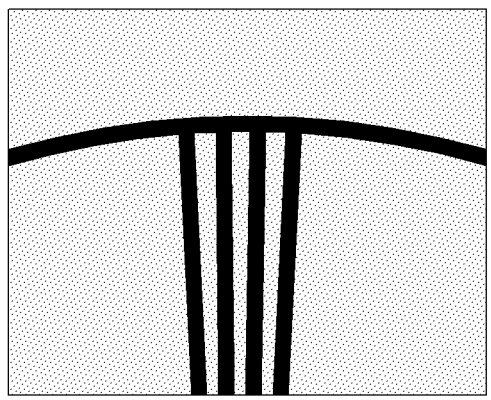
FIG. 2 is a diagram illustrating an original image according to an exemplary embodiment.

FIG. 2 is a diagram illustrating an original image. That is, FIG. 2 is a view illustrating an original image before filter processing. As illustrated in FIG. 2, the detail information may be acquired by performing filter processing such as by performing unsharp masking on the original image.

Figure 3:
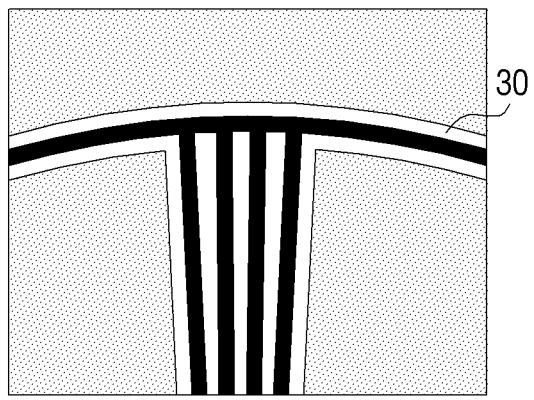
FIG. 3 is a diagram illustrating an image in which an overshoot is generated by image processing according to an exemplary embodiment.

A shoot may be generated as a result of the filter processing being performed on the original image. For example, in the process of acquiring the detail information for the image, an overshoot or undershoot undesired by the user may be generated. In the example of FIG. 3, a strip 30 along the edge region represents the generated shoot which in this example corresponds to an overshoot.

Figure 4:
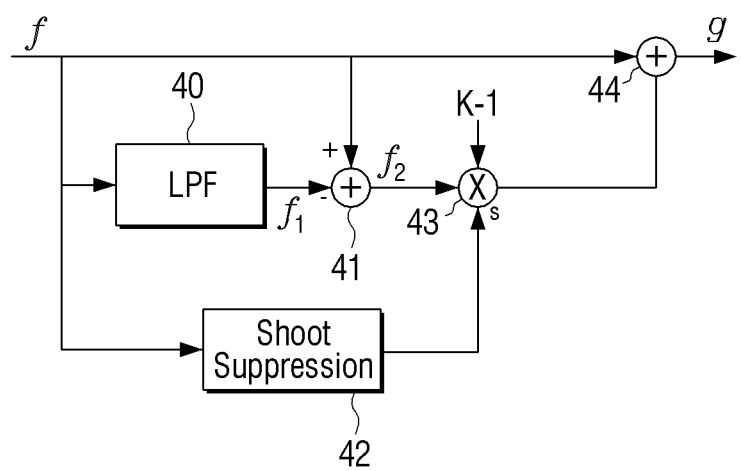
FIG. 4 is a diagram illustrating an apparatus for suppressing an overshoot in the related art.

FIG. 4 is a diagram illustrating an apparatus for suppressing the generated overshoot in the related art. The system illustrated in FIG. 4 includes a shoot suppression block 42 having a shoot suppression factor s (0≤s≤1) as an output, a low pass filter (LPF) 40, adders 41 and 44, and a multiplier 43. As the shoot suppression factor s is increased, the suppression of the shoot increases. The shoot suppression factor may be applied to a detail signal f–f1 for forming a detail improvement item, and the application result may be combined with an input signal f to generate a detail-improved output signal g. The relationship between the output signal g and the input signal f of FIG. 4 is represented by the following Equation 1.

$$g=(f-f_1)*(K-1)*s+f \qquad \text{[Equation 1]}$$

The shoot suppression system as illustrated in FIG. 4 suppresses the generated shoot with respect to an entire image. However, a shoot in a portion of the image in which it would be better to maintain the sharpness is also suppressed. For example, there may be an undershoot or an overshoot in an image which should not be suppressed, but the apparatus illustrated in FIG. 4 is not capable of suppressing some shoots while simultaneously not suppressing other shoots.

Figure 5:
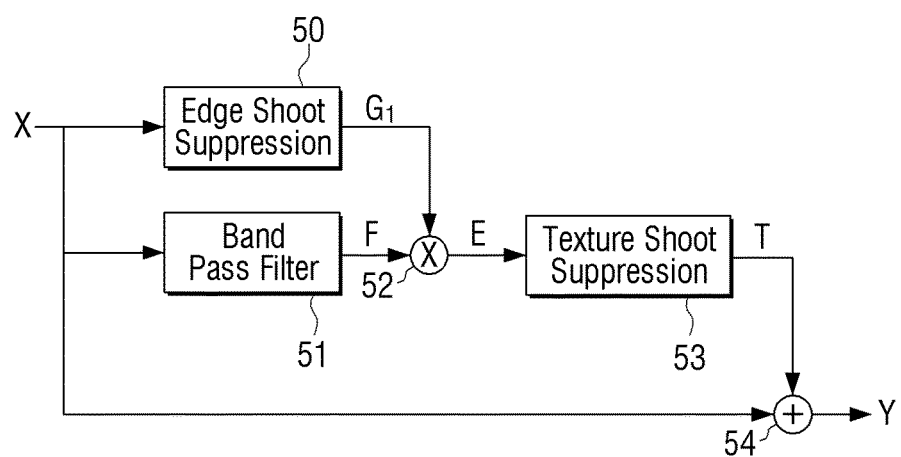
FIG. 5 is a diagram illustrating an apparatus for suppressing an overshoot according to an exemplary embodiment.

Therefore, an apparatus for suppressing a shoot as illustrated in FIG. 5 may be used according to various aspects.

Referring to FIG. 5, electronic device 100 acquires detail information F by applying a filter 51 to an input signal X. The circuit includes a shoot suppression block 50 that may suppress a shoot for an edge region of the input signal X. For example, the electronic device 100 may detect an edge region, determine whether a corresponding pixel is in the edge region, an edge peripheral region, or the other region, and determine a gain $G_1$.

The electronic device 100 may multiply the detail information F and the gain G1 through a multiplier 52, and output a shoot-suppressed signal E for the edge region. The electronic device 100 may input the shoot-suppressed signal E for the edge region to a block 53 that suppresses saturation for the texture region, and output a saturation-suppressed signal T for the texture region. The electronic device 100 may sum the input signal X and the output signal T that has been improved with respect to the edge region and the texture region through an adder 54, and output a final output signal Y.

Figure 6:
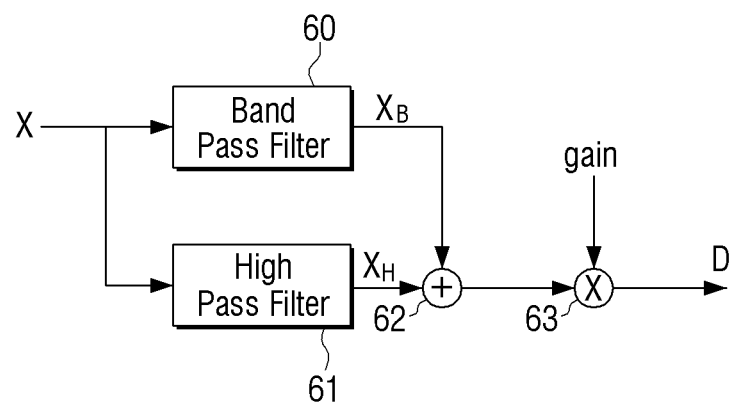
FIGS. 6 and 7 are diagrams illustrating apparatuses for acquiring image detail information according to an exemplary embodiment.
Figure 7:
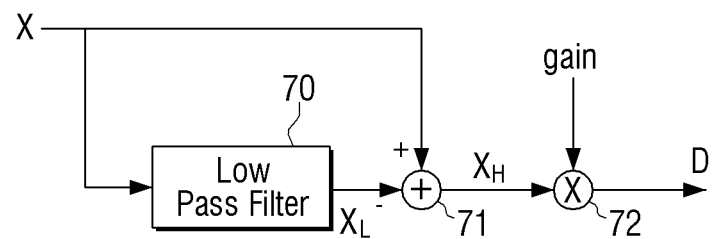

Specifically, the electronic device 100 may acquire detailed information D using a method as illustrated in FIG. 6 or 7.

FIG. 6 is a diagram illustrating an apparatus for acquiring detail information using a filter according to an exemplary embodiment. In this example, the electronic device 100 allows an input signal X to pass through a band pass filter 60 and a high pass filter 61, acquires signals $X_b$ and $X_h$, sum the acquired signals $X_b$ and $X_h$ through an adder 62, and multiplies a certain gain to the summed result through a multiplier 63 to generate a detail signal D.

FIG. 7 is a diagram illustrating an apparatus for acquiring detail information using unsharp masking according to an exemplary embodiment. In this example, the electronic device 100 multiplies a certain gain to a signal $X_H$ in which a signal $X_L$ passing through a low pass filter 70 is subtracted from an input signal X through a multiplier 72 to generate a detail signal D.

Figure 8:
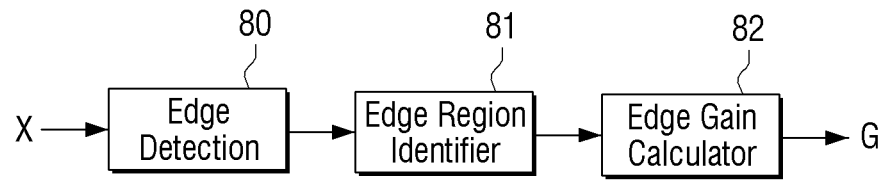
FIG. 8 is a diagram illustrating a process for suppressing an overshoot in an edge region according to an exemplary embodiment.

FIG. 8 is a diagram illustrating a process for suppressing an overshoot in an edge region according to an exemplary embodiment. In this example, the electronic device 100 may suppress an overshoot for an edge region by detecting the edge region through block 80, dividing the edge region into a plurality of regions through block 81, and multiplying gain values to the regions through block 82.

The electronic device 100 may detect the edge region which is a boundary of a region, and points in which brightness of pixels is abruptly or discontinuously changed. For example, the detector 120 of the electronic device 100 may calculate an edge map to detect the edge region. The detector 120 may calculate the edge map using a Sobel edge, a Prewitt edge, a Robert edge, a Canney edge, and the like. Alternatively, the detector 120 may receive an edge map calculated by another source. As described above, the detector 120 may detect the edge region through various methods.

Figure 9:
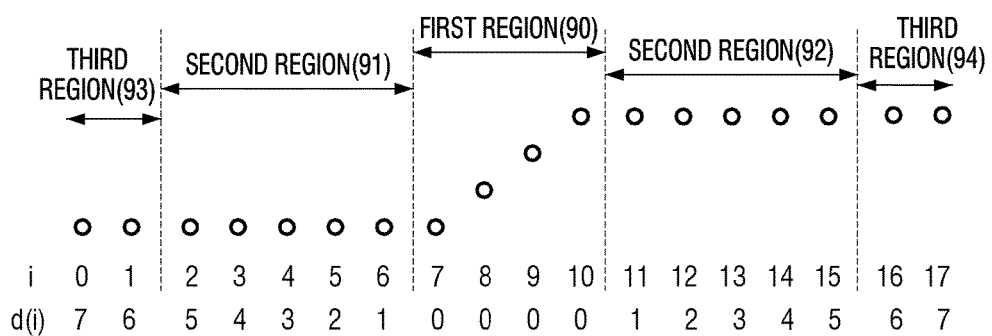
FIG. 9 is a diagram illustrating dividing an edge region into a plurality of regions according to an exemplary embodiment.

The electronic device 100 may divide the detected edge region into a plurality of regions, and apply different gain values to the regions. For example, the corrector 130 of the electronic device 100 may divide the edge region into the plurality of regions. As illustrated in FIG. 9, the edge region may be divided into a first region, a second region, and a third region.

The corrector 130 may detect a region in which a variation of an image signal in the edge region is abruptly changed as a first region 90. In FIG. 9, d(i) represents a distance away a pixel is from the first region in which the image signal is abruptly changed. Therefore, as the number of d(i) is increased, the distance from the first region increases.

The corrector 130 may detect regions of pixels in which d(i) is within a preset value as second regions 91 and 92. For example, as illustrated in FIG. 9, the detector 130 may detect regions in which the value of d(i) is larger than or equal to 1 and is less than or equal to 5 as the second regions 91 and 92.

The corrector 130 may further detect regions which are near to the second regions 91 and 92 but which are not included in the first region 90 and the second regions, as third regions 93 and 94. In this example, the corrector 130 detect regions in which the value of d(i) is greater than 5, (i.e. 6 and 7) as the third regions 93 and 94.

Unlike the method as illustrated in FIG. 9, the corrector 130 may divide the edge region into any number of edge regions and is not limited thereto.

Figure 10:
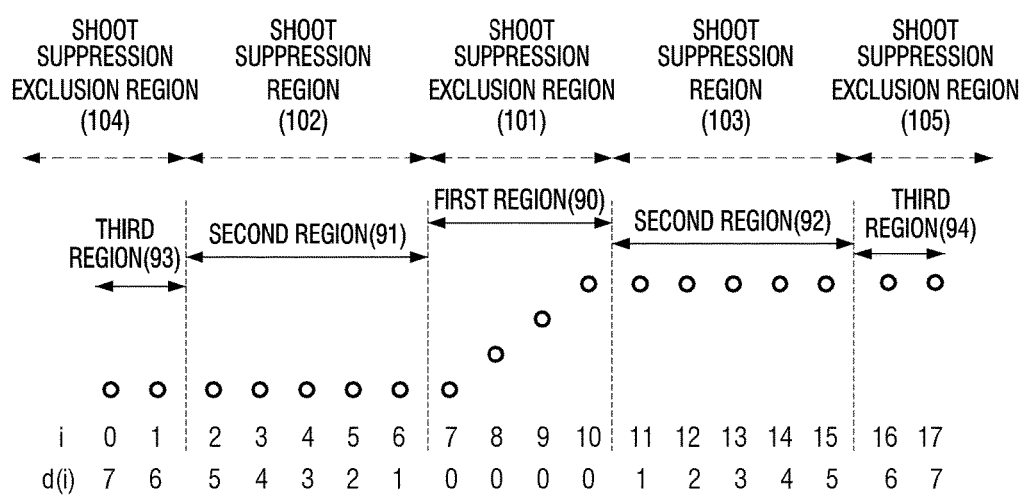
FIGS. 10 and 11 are diagrams illustrating the application of different gain values to a plurality of regions of an edge region according to an exemplary embodiment.

FIG. 10 is a diagram illustrating suppressing an overshoot for an edge region by multiplying gain values to regions according to an exemplary embodiment.

Referring to FIG. 10, the corrector 130 may multiply a preset first gain value to the first region 90, and multiply a second gain value and a third gain value, which are smaller than the first gain value, to the second regions 91 and 92 and the third regions 93 and 94. Therefore, the first region 90 in which the image signal abruptly changes may have a different gain value than the second and third regions 91-94. Likewise, the second regions 91 and 92 may have a different gain value than the third regions 93 and 94. For example, the first to third gain values may be real numbers which are larger than or equal to zero and equal to or less than 1.

To maintain a signal magnitude to maintain sharpness of an image with respect to the first region 90, the corrector 130 may apply a large gain value to the first region 90. For example, a gain value of 1 may be applied to the first region 90. Therefore, the first region 90 becomes a shoot suppression exclusion region 101 in which an overshoot or an undershoot is not suppressed.

The corrector 130 may suppress an overshoot by applying a gain value that is smaller than the first gain value to the second regions 91 and 92. For example, the corrector 130 may suppress the overshoot by applying a gain value that is close to zero, for example, 0.1 to the second regions 91 and 92. Therefore, the second regions 91 and 92 become shoot suppression regions 102 and 103.

In this example, the third regions 93 and 94 are farther away from the first region 90 than the second regions 91 and 92. Accordingly, the third regions 93 and 94 may have little variation of the image signal, and thus the third regions 93 and 94 may become shoot suppression exclusion regions 104 and 105. Here, the corrector 130 may not suppress an overshoot by instead applying a large gain value to the third regions 93 and 94 as in the first region 90.

Figure 11:
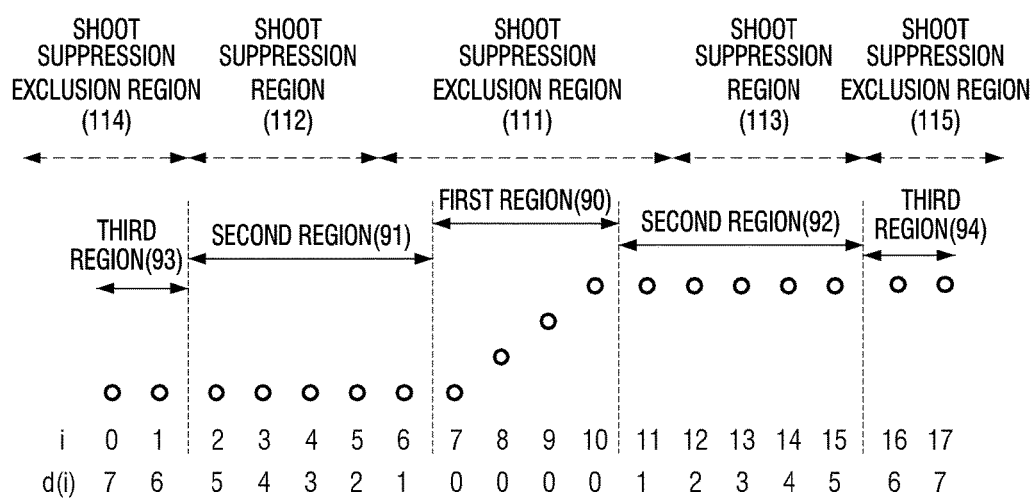

As illustrated in FIG. 11, the corrector 130 may expand a region in which the overshoot is not suppressed. For example, the corrector 130 may apply a large gain value (for example, 1) to the first region 90 and partial regions of the second regions 91 and 92 thereby causing the first region 90 and the partial regions of the second regions 91 and 92 to become the shoot suppression exclusion region 111. In this example, the shoot suppression exclusion region 111 is extended or widened by one pixel in each direction away from the first region 90.

Figure 12:
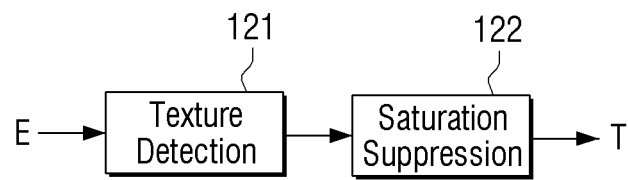
FIG. 12 is a diagram illustrating a process for suppressing saturation in a texture region according to an exemplary embodiment.

FIG. 12 is a diagram illustrating a process for suppressing a shoot, that is, saturation in a texture region according to an exemplary embodiment. The electronic device 100 may detect a texture region through block 121, and suppress a shoot generated in the texture region by applying different gain values according to an image signal of the texture region through block 122.

The detail information for the texture region may include a saturated region in which the image signal is excessively amplified causing a white output to be generated. Therefore, the corrector 130 may apply a gain value of less than 1 to the region of the texture region in which the saturation is generated.

Figure 13:
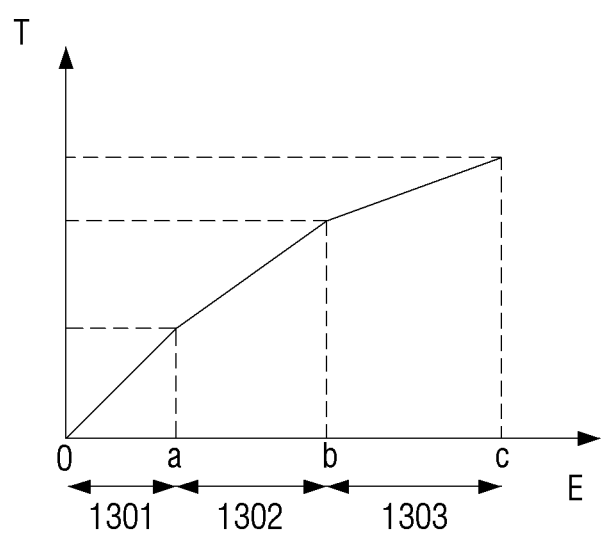
FIG. 13 is a diagram illustrating different gain values applied to a plurality of regions of a texture region according to an exemplary embodiment.

Specifically, the detector 120 of the electronic device 100 may detect the texture region. As illustrated in FIG. 13, the corrector 130 may apply a gain value of below 1 in response to an image signal corresponding to the texture region being larger than or equal to a preset value. In FIG. 13, an X-axis indicates a magnitude of an input signal E corresponding to a texture region, and a Y-axis indicates a magnitude of an output signal T in which saturation suppression is performed on the image signal corresponding to the texture region.

In this example, shoot suppression for a region 1301 is not to be performed because the magnitude of the input signal E is less than or equal to a preset value a. Accordingly, the corrector 130 may apply a gain value of 1. However, shoot suppression for a region 1302 is to be performed because the magnitude of the input signal is larger than the preset value a and is less than or equal to a preset value b. Accordingly, the corrector 130 may apply a preset gain value of below 1, for example, 0.9, 0.8, 0.7, and the like.

In addition, greater shoot suppression is to be performed for a region 1303 because the magnitude of the input signal is larger than the preset value b and is less than or equal to a preset value c. Accordingly, the corrector 130 may apply a preset gain value which is smaller than the gain value applied to the region 1302, for example, 0.6, 0.5, 0.4, and the like.

As described in the above examples, the method of dividing the texture region into three regions, and applying different gain values to the three regions is merely exemplary. It should be appreciated that the corrector 130 may divide the texture region according to a feature of the image, a magnitude of an image signal of the texture region, or the like, and may apply the different gain values to the regions.

Figure 14:
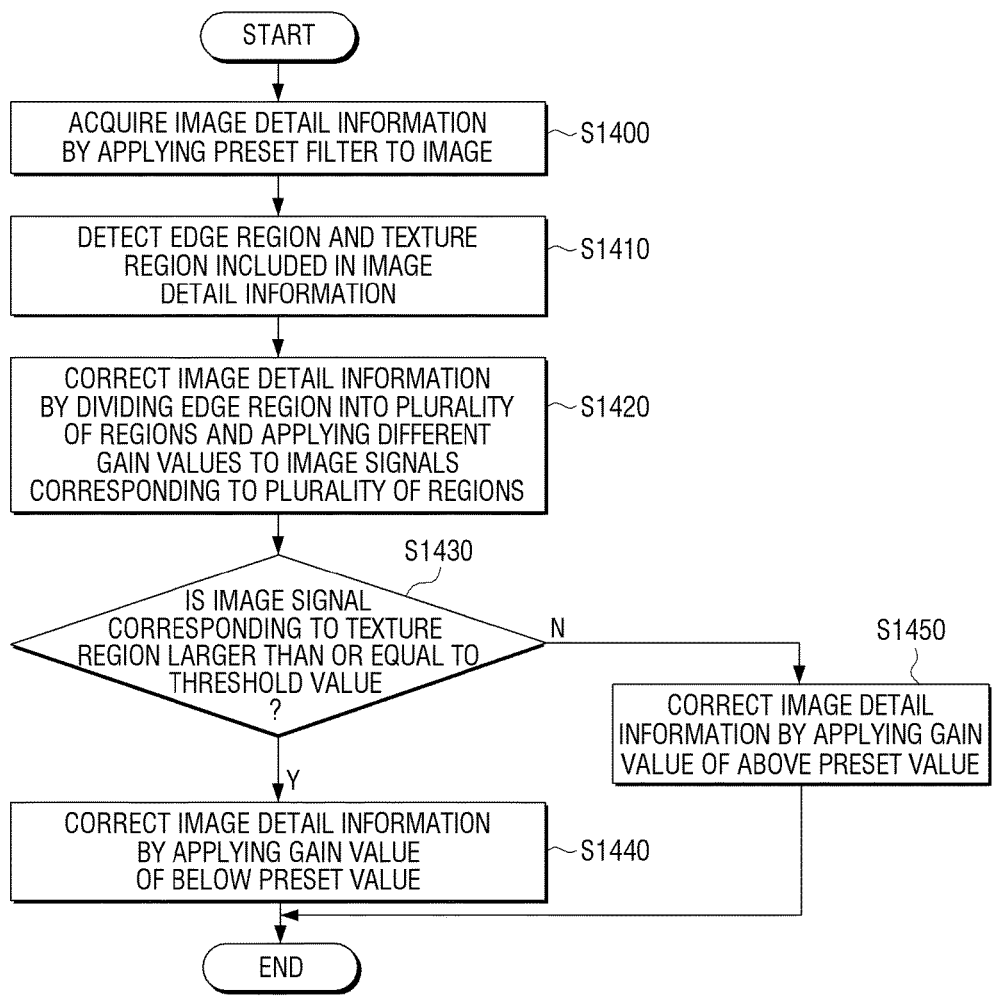
FIG. 14 is a diagram illustrating an image processing method of an electronic device according to an exemplary embodiment.

FIG. 14 is a diagram illustrating an image processing method according to an exemplary embodiment.

Referring to FIG. 14, the electronic device 100 acquires detail information for an image by applying a preset filter to the image (S1400). For example, the detail information for the image may be a detail signal acquired by applying a preset filter to an image signal.

The electronic device 100 may acquire the detail information for the image by applying a filter to improve sharpness of the image. For example, the electronic device 100 may acquire the detail information by performing filter processing such as an unsharp masking on an original image.

The electronic device 100 detects an edge region and a texture region included in the detail information for the image (S1410). The edge region refers to a boundary of a region, and may include points in which a brightness of pixels is abruptly discontinuously changed, that is, in which a brightness of pixel values changes. The electronic device 100 may calculate an edge map for detecting the edge region. For example, the electronic device 100 may calculate the edge map using a Sobel edge, a Prewitt edge, a Robert edge, a Canney edge, and the like. Alternatively, the electronic device 100 may receive an edge map calculated by an outside source. As described above, the detector 120 may detect the edge region from the image detail information through various methods.

The detector 120 of the electronic device 100 may detect a texture region of the image using various methods. For example, the detector 120 may divide an input image into blocks that have a certain size, and may determine the texture image using the number of pixels included within each block and luminance change information. Alternatively, the detector 120 may detect the texture region using a standard deviation of the image.

The above-described texture region detection methods are merely exemplary, and the detector 120 may use various methods for detecting the texture region from the image detail information. For example, the detector 120 may detect the edge region, and then detect the texture region. As another example, the detector 120 may simultaneously detect the edge region and the texture region.

The electronic device 100 may correct the image detail information by dividing the edge region into a plurality of regions, and by applying different gain values to image signals corresponding to the plurality of regions (S1420).

The electronic device 100 may divide the detected edge region into a plurality of regions, and apply different values to the regions. That is, the electronic device 100 may divide the edge region into the plurality of regions. For example, the electronic device 100 may divide the edge region into two regions, three regions, or more regions.

For example, the edge region may be divided into three regions. Accordingly, the electronic device 100 may detect a region in which a variation of an image signal in the edge region is abruptly changed as a first region. Referring again to FIGS. 9-11, d(i) represents a distance spaced apart from the first region by designating the first region in which the image signal as zero. Therefore, as the distance from the first region increases the number d(i) also increases.

Therefore, the electronic device 100 may detect regions in which d(i) is within a preset value as second regions 91 and 92. For example, the electronic device 100 may detect regions in which the value of d(i) is larger than or equal to 1 and is equal to or less than 5 as the second regions 91 and 92.

The electronic device 100 may detect regions which are near to the second regions 91 and 92, but are not included in the first region 90 and the second regions 91 and 92, as third regions 93 and 94. That is, the electronic device 100 may detect regions in which the value of d(i) is 6 and 7 as the third regions 93 and 94.

According to various aspects, the electronic device 100 may suppress a shoot by applying different gain values to the divided regions. That is, the electronic device 100 may multiply a preset first gain value to the region which the variation of the image signal is abruptly changed therein and detected as the first region, and multiply a second gain value and a third gain value, which are smaller than the first gain value, to the second regions and the third regions, respectively.

For example, to maintain sharpness of an image with respect to the first region, the electronic device 100 may apply a large gain value, for example, 1 to the first region. Therefore, the first region becomes a shoot suppression exclusion region and thus an overshoot in the first region is not suppressed.

The electronic device 100 may suppress a shoot by applying a gain value smaller than the first gain value to the second regions. For example, the electronic device 100 may suppress the shoot by applying a gain value that is closer to zero, for example, 0.1 to the second regions. Therefore, the second regions become shoot suppression regions.

As an example, the third regions may be far away from the first region, and the third regions may be determined to have little variation of the image signal. Thus, the third regions may be shoot suppression exclusion regions. That is, the electronic device 100 may not suppress a shoot by applying a large gain value to the third regions as in the first region.

The electronic device 100 may expand a region in which the shoot is not suppressed. That is, the electronic device 100 may apply a large gain value (for example, 1) to the first region and partial regions of the second regions close to the first region so that the first region and the partial regions of the second regions become the shoot suppression exclusion region.

The electronic device 100 determines whether or not an image signal corresponding to the texture region is larger than or equal to a threshold value (S1430). In response to a magnitude of the image signal being larger than or equal to the threshold value (S1430-Y), the electronic device 100 corrects the image detail information by applying a gain value, which is less than a preset value, to the image signal of the texture region in which the magnitude of the image signal is larger than or equal to the threshold value (S1440).

For example, the electronic device 100 may determine that shoot suppression is to be performed for a region in which the magnitude of the input signal is larger than a preset value a and is less than or equal to a preset value b. Accordingly, the electronic device 100 may apply a preset gain value (for example, 0.8) of below 1.

As another example, the electronic device 100 may determine that greater shoot suppression is to be performed for a region in which the magnitude of the input signal is larger than the preset value b and is less than or equal to a preset value c. Accordingly, the electronic device 100 may apply a gain value (for example, 0.5) which is smaller than the gain value applied to the region in which the magnitude of the input signal is larger than the preset value a and is less than or equal to the preset value b.

In response to the magnitude of the image signal being less than the threshold value (S1430-N), the electronic device 100 corrects the image detail information by applying a gain value, which is larger than or equal to the preset value, to the image signal of the texture region in which the magnitude of the image signal is less than the threshold value (S1450). For example, the electronic device 100 may determine that shoot suppression is not to be performed for a region in which the magnitude of the input signal is less than the threshold value. Accordingly, the electronic device 100 may apply a large gain value, for example, 1.

Through the above-described electronic device 100, the user may view an improved image in which sharpness is improved in the edge region, and saturation is suppressed in the texture region.

The image processing methods of an electronic device according to the above-described various exemplary embodiments may be coded in software and stored in a non-transitory readable medium. The non-transitory readable medium may be mounted on various devices, and used.

The non-transitory readable medium is may be a medium configured to temporarily store data such as a register, a cache, or a memory and an apparatus-readable medium configured to semi-permanently store data. Specifically, the non-transitory apparatus-readable medium may include a compact disc (CD), a digital versatile disc (DVD), a hard disc, a Blu-ray disc, a universal serial bus (USB), a memory card, or a read only memory (ROM), and provided.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A method of processing an image, the method comprising:
    acquiring image detail information by applying a filter to the image;
    detecting an edge region and a texture region from the image detail information;
    dividing the edge region into a first region in response to the variation of image signal corresponding to the edge region being larger than or equal to a preset value and into a second region in response to the variation of image signal corresponding to the edge region being less than the preset value; and
    correcting the image detail information by applying a first gain value to the first region and a second gain value to the second region, and applying a gain value to an image signal corresponding to the texture region according to a magnitude of the image signal corresponding to the texture region,
    wherein the first gain value is larger than the second gain value.

2. The method of claim 1,
    wherein the dividing comprises dividing the edge region into the first region, the second region, and a third region that is within a preset range away from the second region and that is not included in the first region and the second region, and
    wherein the correcting comprises applying the first gain value to the first region and the third region, and applying the second gain value to the second region.

3. The method of claim 2, wherein applying a first gain value or applying a second gain value comprises:
    applying the first gain value to the first region, a portion of the second region within a preset range away from the first region, and the third region, and
    applying the second gain value to a region of the second region other than the portion to which the first gain value is applied.

4. The method of claim 1, wherein the correcting comprises, in response to the image signal corresponding to the texture region being larger than or equal to a preset threshold value, correcting the image detail information by applying a gain value that is less than a preset value to the image signal corresponding to the texture region.

5. The method of claim 1, wherein the correcting comprises determining a region in which the image signal corresponding to the texture region is larger than or equal to a preset threshold value as a region in which the image signal is saturated.

6. The method of claim 1, wherein the correcting comprises:
    applying a first gain value in response to the image signal corresponding to the texture region being larger than or equal to a first threshold value, or applying a second gain value in response to the image signal corresponding to the texture region being larger than or equal to a second threshold value, and
    the first gain value is different from the second gain value.

7. An electronic device comprising:
    an acquirer which acquires image detail information by applying a filter to an image;

a detector which detects an edge region and a texture region from the image detail information; and a corrector which corrects the image detail information by dividing the edge region into a first region in response to the variation of image signal corresponding to the edge region being larger than or equal to a preset value and into a second region in response to the variation of image signal corresponding to the edge region being less than the preset value and applying a first gain value to the first region and a second gain value to the second region, and applying a gain value to an image signal corresponding to the texture region according to a magnitude of the image signal corresponding to the texture region, wherein the first gain value is larger than the second gain value.

8. The electronic device of claim 7, wherein the corrector is configured to:

divide the edge region into the first region, the second region, and a third region that is within a preset range away from the second region and that is not included in the first region and the second region, and apply the first gain value to the first region and the third region, and apply the second gain value to the second region.

9. The electronic device of claim 8, wherein the corrector is configured to:

apply the first gain value to the first region, a portion of the second region within a preset range away from the first region, and the third region, and apply the second gain value to a region of the second region other than the portion to which the first gain value is applied.

10. The electronic device of claim 7, wherein the corrector is configured to, in response to the image signal corresponding to the texture region being larger than or equal to a preset threshold value, correct the image detail information by applying a gain value less than a preset value to the image signal corresponding to the texture region.

11. The electronic device of claim 7, wherein the corrector is configured to determine a region in which the image signal corresponding to the texture region is larger than or equal to a preset threshold value as a region in which the image signal is saturated.

12. The electronic device of claim 7, wherein the corrector is configured to:

apply a first gain value in response to the image signal corresponding to the texture region being larger than or equal to a first threshold value, or apply a second gain value in response to the image signal corresponding to the texture region being larger than or equal to a second threshold value, and the first gain value is different from the second gain value.

* * * * *